March 16, 1954 W. D. CROPLEY 2,672,213
FILTER AND METHOD OF MAKING THE SAME
Filed June 19, 1952 4 Sheets-Sheet 1
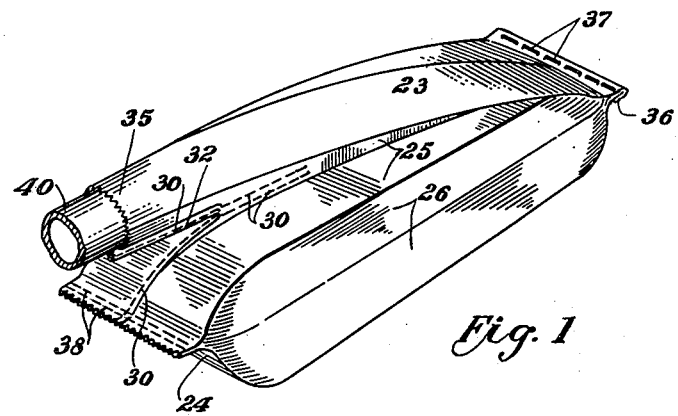
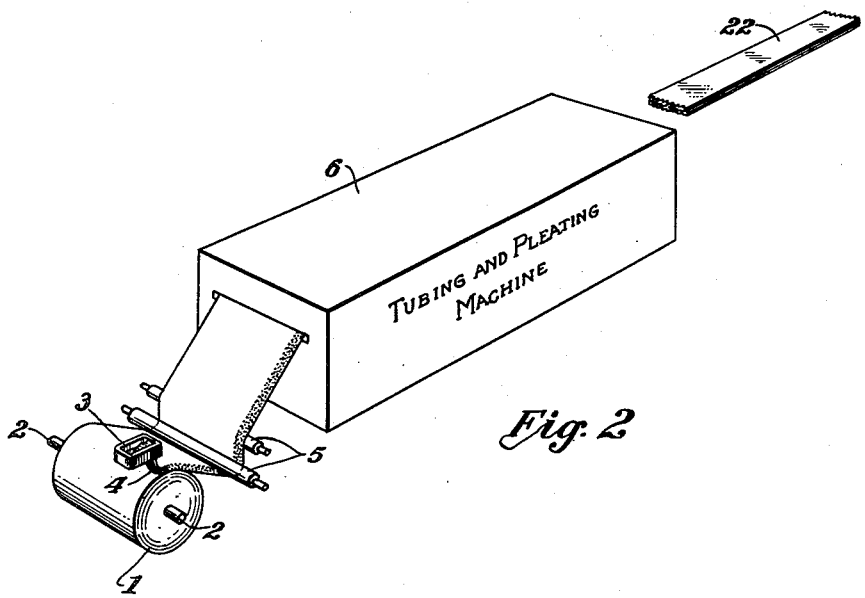
INVENTOR.
William D. Cropley
BY Alfred G. Gross
ATTORNEY.

March 16, 1954     W. D. CROPLEY     2,672,213
FILTER AND METHOD OF MAKING THE SAME
Filed June 19, 1952     4 Sheets-Sheet 2

INVENTOR.
William D. Cropley
BY Alfred G. Gross
ATTORNEY.

March 16, 1954 W. D. CROPLEY 2,672,213
FILTER AND METHOD OF MAKING THE SAME
Filed June 19, 1952 4 Sheets-Sheet 3

INVENTOR.
William D. Cropley
BY Alfred G. Gross
ATTORNEY.

March 16, 1954  W. D. CROPLEY  2,672,213
FILTER AND METHOD OF MAKING THE SAME
Filed June 19, 1952  4 Sheets-Sheet 4

INVENTOR.
William D. Cropley
BY Alfred G. Gross
ATTORNEY.

Patented Mar. 16, 1954

2,672,213

UNITED STATES PATENT OFFICE 2,672,213

FILTER AND METHOD OF MAKING THE SAME

William D. Cropley, Canton, Ohio, assignor to The Hoover Company, North Canton, Ohio, a corporation of Ohio Application June 19, 1952, Serial No. 294,450

8 Claims. (Cl. 183—51)

It is a principal object of my invention to provide a filter for suction cleaning apparatuses completely formed of a single sheet of stock material cut the length of the filter and having an inlet conduit opening into the filter proper above the bottom thereof formed of the same piece of material out of which the body of the filter is formed.

It is a further object of the present invention to provide a method of forming a filter of the above described character from a continuous strip of stock material by a process which does not require blanking or wasting any of the stock from which the filter is constructed.

It is a further object of the invention to provide a filter constructed of stock material formed into a pleated tubular member which flattens out into a substantially plane body having flat upper and lower surfaces joined at corresponding longitudinal edges by infolded pleats and subsequently formed to provide an integral inlet conduit separated at its lower end from the main body of the filter and joining and opening thereinto at a point intermediate the ends of the filter so as to provide a dirt pocket well below the point at which the inlet conduit opens into the filter body.

It is still another object of my invention to provide a filter of the above described character in which the portion of the filter forming the inlet conduit is isolated from the main body of the filter by a double line of stitching extending longitudinally of the filter for a portion of the length thereof from one end and separated for a part of the length of the filter between the lines of stitching to provide an inlet conduit which is free to move relatively to the main body of the filter for a portion of its length.

Other objects and advantages of the invention will become apparent as the description proceeds when taken in connection with the accompanying drawing, in which:

Figure 1 is a perspective view of my improved filter showing the same as it appears when inflated as in use and connected to a discharge tube of a suction cleaner;

Figure 2 is a diagrammatic perspective view of an apparatus which forms individual flat folded filter tubes from a continuous length of filter stock;

Figure 3:
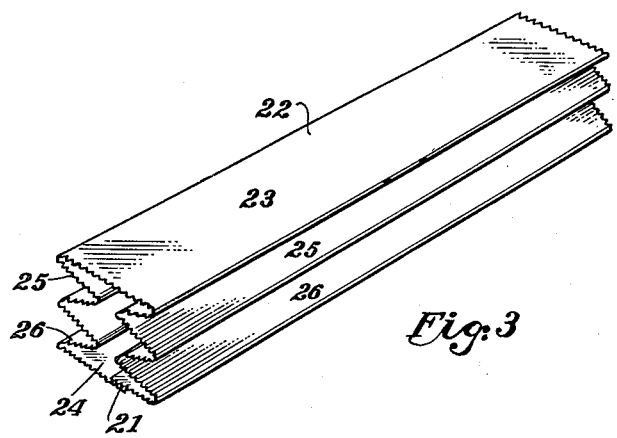
Figure 3 is a perspective view illustrating the tubular filter members formed by the apparatus of Figure 2 showing the same slightly expanded.

Referring now to the drawing and first to Figure 2, the apparatus and process for forming the basic tubular member is illustrated. The filter and process of making the same outlined herein can be utilized for cloth or paper filters; however, for convenience, the material of the filter will be referred to as paper hereinafter. A roll of paper filter stock 1 is rotatably supported upon a suitable spindle 2 under a glue pot 3 which discharges through a wick 4. The wick 4 engages one edge of the stock 1 and applies a narrow layer of adhesive along one edge thereof as the filter stock is unwound from the roll. The stock unwound from the roll passes over a pair of straightening guide rollers 5 and thence into a standard machine 6 which forms the sheet stock 1 into a tube by folding the edge of the stock to which the adhesive is applied under the other edge of the stock and pressing the two edge portions of the stock together to bond the same with the adhesive. The machine 6 also pleats, flattens and then cuts the pleated and flattened tubular stock to predetermined lengths. The cut, tubed, pleated and flattened basic filter members discharged by the machine 6 are indicated at 22 and form the basic tubular stock from which the filters are made.

A filter stock member 22 is shown in Figure 3 slightly opened. Each filter 22 comprises substantially flat top and bottom surfaces 23 and 24, respectively, which are joined along corresponding longitudinal edges by a pair of infolded pleats. The edges of top flat surface 23 are joined by pleats 25 which in turn are joined to pleats 26 integral with the longitudinal edges of the bottom surface 24. The tube forming joint between the opposite edges of the stock 1 formed by the adhesive is indicated at 21.

Figure 4:
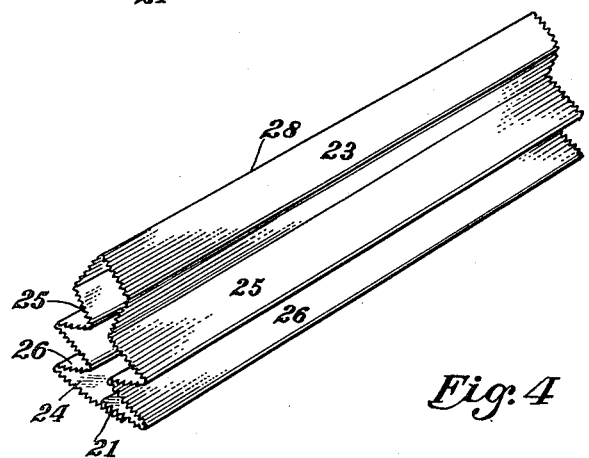
Figure 4 is a view similar to Figure 3 illustrating the first step in re-forming the filter of Figure 3 to produce a separate inlet conduit thereon.
Figure 5:
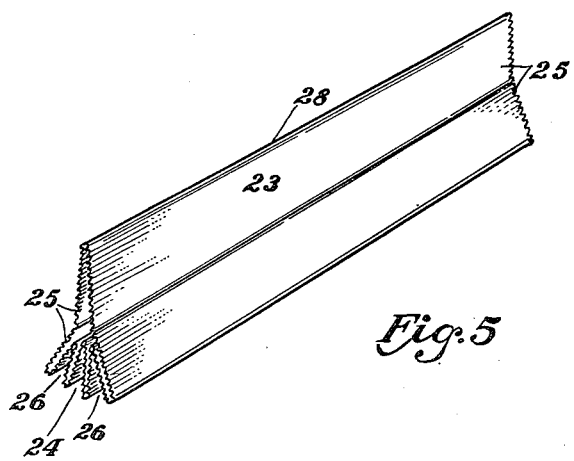
Figure 5 is a view similar to Figure 4 illustrating the second step in the process of forming the inlet conduit.
Figure 6:
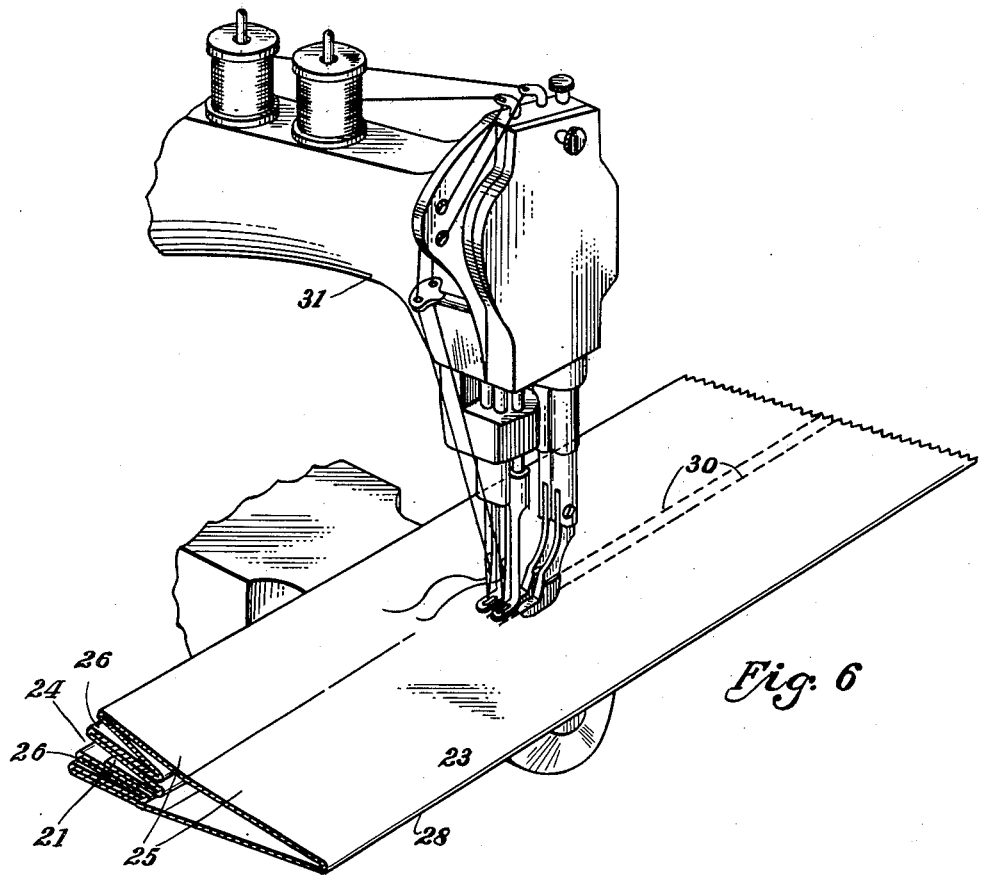
Figure 6 is a view drawn to a slightly enlarged scale illustrating the stitching process applied to the filter in the condition of Figure 5 forming the first step in isolating the inlet conduit.

The creased flat tubular filter member 22, as discharged from the apparatus of Figure 2, is first opened up to the condition shown in Figure 3. The top surface 23 is then formed with a central crease 28 shown in Figure 4. The portion of the filter comprising the top surface 23 and the adjoining halves of the pleat 25 is next flattened along the crease 28 to form a tongue as shown in Figure 5 and the bottom surface 24 is infolded and creased to form a temporary pleat between pleats 26 as indicated in Figure 5. In the next step of the process, the pleat formed by the bottom surface 24 and pleats 26 are folded together with the portion terminating in the crease 28 forming a flattened projecting tongue which is placed on a double needle sewing machine 31 as shown in Figure 6 and two spaced apart parallel lines of stitching 30 are run from one end of the filter body 22 lengthwise thereof a distance approximately one-third the length of the body. Though stitching is preferred for this purpose, the two portions of the filter joining the pleats 28 may be secured along the lines 30 by glue or any other suitable means. The stitching 30 secures together those portions of the oppositely facing pleats 25 which are directly joined to the now folded top surface 23. The lines of stitching are applied to the right of the pleats 26 and folded surface 24, as viewed in Figure 6, in order not to engage any of these elements.

Figure 7:
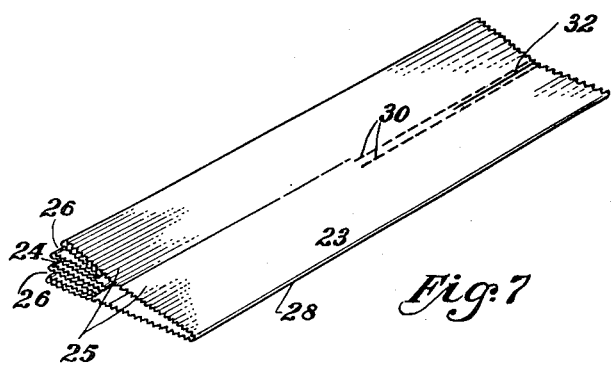
Figure 7 is a view illustrating the filter after the completion of the step of Figure 6 showing the severing step to free a portion of the inlet conduit from the body of the filter.

After the stitching operation, the filter is severed along the line 32 between the lines of stitching for approximately half their length as illustrated in Figure 7.

Figure 8:
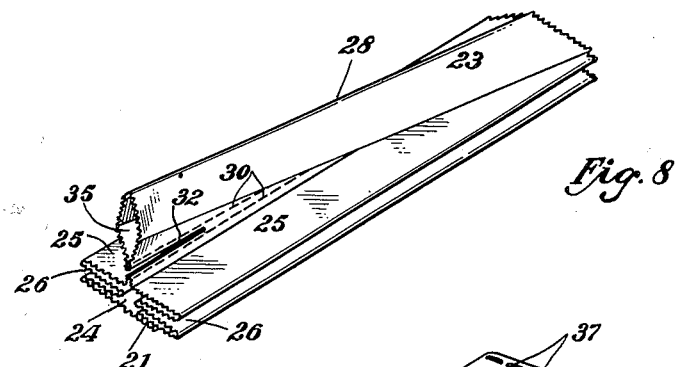
Figure 8 is a view illustrating the first step in refolding the filter of Figure 7 to its final shape.

After the cut 32 is applied to the bag, the surface 24 is again flattened with the pleats 26 folded flat thereagainst as illustrated in Figure 8. At the end of the bag remote from the cut 32, the flat surface 23 and pleats 25 are folded flat on the pleats 26 and surface 24. On the stitched and severed end of the filter, however, the stitch 30 and cut 32 has formed a tubular inlet conduit 35 which is distinct from the body of the filter at the end thereof from which the stitching and severing cut run merging into the body of the filter above the stitching and opening thereinto. It is apparent that the conduit 35 is formed in part from the surface designated 23 and portions of the pleats 25.

Figure 9:
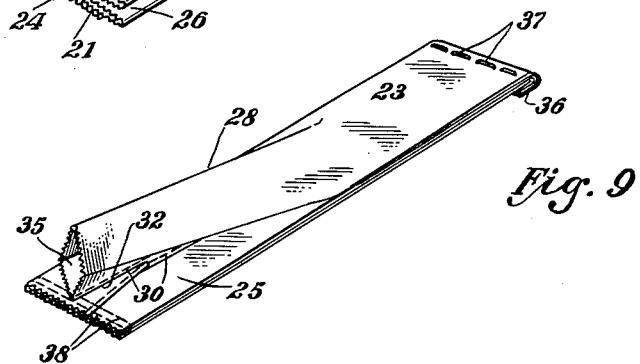
Figure 9 is a view similar to Figure 8 illustrating the condition of the filter after closure of the ends of the filter body.

The end of the filter remote from the open end of the inlet conduit 35 is now turned over to form a fold 36 and secured by stitching, stapling or gluing if this closure is intended to be permanent or a known type of closure clip if the filter is the type intended to be reusable by emptying previously accumulated dirt. As shown in Figure 9, the folded end 36 of the filter is secured by staples 37. As also shown in Figure 9, those portions of the filter adjacent the inlet conduit 35, but not forming part thereof, are now permanently closed by means of stitching 38, or other suitable permanent closure means.

Figure 10:
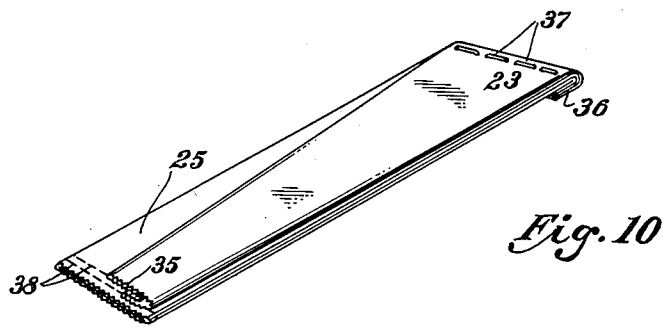
Figure 10 illustrates the final pleated filter showing the manner in which it is folded flat for packing and shipping.

In order to fold the filter as flat as possible to facilitate packing and shipping, the inlet conduit 35 is folded flat, as indicated in Figure 10, so that one creased side thereof aligns with one side of the flat folded filter and the other creased side of the conduit 35 lies diagonally across the filter body. This provides a completely flattened filter which may be folded double, for example, for ready insertion into a cardboard carton for handling and distribution.

Referring now to Figure 1, the filter is illustrated in the inflated condition thereof in use. In this figure, it is apparent that the ends of the filter closed by staples 37 and stitching 38 lie in a common plane parallel to the plane of the under surface 24 and the portions of the upper surface 23 not gathered to form the inlet conduit 35. It is also apparent that the inlet conduit 35 rises from the central portion of the filter body proper considered in the direction of the staples 37 and stitches 38 and opens thereinto well above the stitching 38, thus forming a dirt trap or collecting chamber in that portion of the filter proper between the stitching 38 and the end of the stitching 30 remote therefrom. It is to be noted that inflation of the bag expands the pleats 26 and the remaining portion of the pleats 25 in a direction generally away from and normal to the axis of the inlet conduit 35.

The above described process produces a filter which is made from an uncut and unformed continuous strip of filter stock without wasting any of the filter material having a distinct inlet conduit integral with the filter body but segregated from the filtering and dirt trapping portions thereof to form a distinct unit capable of independent pivotal movement with respect to the body of the filter proper. It is to be understood that the conduit 35 of the filter is joined to a discharge conduit 40 of a suction cleaning apparatus by any suitable means. As shown herein, the discharge conduit 40 is telescopically received within the inlet conduit 35. Any suitable means may be used to secure the conduits 35 and 40 together.

While the invention has been illustrated and described in detail herein, it is not to be limited thereto but various changes may be made in the construction, design and arrangement of parts without departing from the spirit of the invention or the scope of the appended claims.

I claim:

1. A filter for suction cleaners comprising a tubular body of filtering material having front and rear walls joined by infolding pleats along corresponding longitudinal edges of said walls, a double line of stitching extending upwardly from the lower end of said tubular body and terminating short of the upper end of said body, said stitching joining the portions of the pleats directly joined to said front wall to form a conduit section with a portion of said front wall and said portions of said pleats, said conduit section opening into said tubular body above said stitching and having an open lower inlet end segregated from said tubular body by said stitching, said filter material being severed between said double lines of stitching from the lower end thereof upwardly to a point short of the upper end of said stitching, means for closing the upper end of said tubular body, and means closing that portion of the lower end of said tubular body severed from the open end of said inlet conduit whereby a dirt pocket is formed in said filter below the point at which said conduit opens into said filter.

2. A filter for suction cleaners comprising a tubular body having upper and lower walls, infolding pleats joining corresponding longitudinal edges of said walls, a double line of stitching extending from one end of said body toward but terminating short of the other end of said body, said stitching joining the faces of the pleats immediately joined to one of said walls to form a conduit of portions of said one wall and said pleat faces isolated from said tubular body by said stitching, said filter being severed between said lines of stitching from said one end of said body to a point short of the end of said stitching whereby the open end of said inlet conduit is freed of the main portion of said filter body longitudinally thereof, and means closing the open ends of said tubular body whereby the portion of said filter body between said one end thereof and the end of said stitching forms a dirt trap below the inlet of said conduit into said tubular body.

3. The method of making paper filters for suction cleaners from tubular stock having opposed surfaces joined along corresponding edges thereof by infolded pleats which includes the steps of folding one of said surfaces on the center line thereof and the sides of the pleats directly joined to said one surface to bring the inner faces thereof into juxtaposed relation, stitching said juxtaposed faces together adjacent the junctions of said sides of said pleats to the other sides of said pleats along closely spaced lines extending from one end of the tube parallel to the axis thereof to points short of the other end of the tube, severing the material between the lines of stitching from said one end of the tube to a point short of the ends of said stitching and closing said one end of said tube except for the portion of said one surface and pleats segregated by said lines of stitching.

4. A filter for suction cleaners comprising a tubular body, means closing the upper end of said tubular body, means securing two circumferentially spaced portions of the inner face of said tubular body together along two adjacent lines extending from the lower end of said body parallel to the axis thereof upwardly to a point spaced from the upper end of said body and positioned to segregate the lower end of said body into a large and small tubular section forming a dirt pocket and an inlet conduit respectively, said secured section of said body being severed between said two lines from the lower end of the body to a point short of the upper ends of the said securing means, said inlet conduit and said dirt pocket each opening into the upper end of said body above the upper end of said securing means, and means closing the lower end of said dirt pocket.

5. Apparatus according to claim 4 in which the said closing means holds the lower end of the dirt pocket folded flat in a plane normal to a plane through the axis of the small tubular section and passing through the dirt pocket whereby the dirt pocket curves away from the inlet conduit toward the said closed end to provide clearance for movement of the inlet conduit with respect to the dirt pocket.

6. A filter for suction cleaning apparatus comprising a tubular body of filter material, means joining two circumferentially spaced portions of the inner wall of said tubular body along closely spaced lines extending parallel to the axis of said body from one end thereof to points short of the other end thereof, said joined portions of said inner wall being separated between the said spaced lines from said one end of said filter to a point short of the ends of said spaced lines to segregate said filter into large and small tubular sections forming a dirt pocket and an inlet conduit respectively, said tubular body having pleats extending longitudinally thereof on opposite sides of a plane including the axis of said inlet conduit and normal to the planes of said pleats when said pleats are folded flat, and the open end of the dirt pocket and open end of the tubular body remote from the dirt pocket and inlet conduit being folded flat and closed with the flat folded closed ends lying in planes parallel to the planes of the pleats whereby the entire filter may be folded flat and the closed end of the dirt pocket is positioned in spaced relation to the inlet conduit.

7. The process of making paper filters which comprises feeding filter paper from a roll of filter stock, applying an adhesive to one edge of said stock, folding said stock into a tube with the adhesive carrying edge thereof in contact with the other edge of said stock, severing said tube into equal lengths to form filter tubes, joining the inner faces of each tube along adjacent parallel lines spaced circumferentially of said tube and extending from one end of said tube to a point spaced from the other end thereof to segregate said one end of said tube into large and small cross section tubular portions separated by joined inner face portions thereof, severing the material between said adjacent parallel secured lines from one end of said material to a point short of the inner end of said lines, folding the other end of the tube and the end of the large cross section tubular portion flat in parallel planes normal to a plane through the axis of the tubular portion of small cross section, and securing the flat folded end portions closed.

8. The method of making filters for suction cleaners from tubular filter stock which comprises the steps of folding the tubular filter stock to bring two portions of the inner surface of the stock into contact, securing said two portions of the stock together along two closely spaced lines extending parallel to the axis of the tubular stock and extending from one end of the stock to a point spaced from the other end thereof with the portions of the inner surface of the stock secured together along said parallel lines spaced circumferentially of the stock to segregate the said one end of the stock into large and small diameter tubular sections, severing the stock between the two secured lines from the said one end of the stock to a point short of the ends of the said lines, and closing the open end of the said large diameter tubular section.

WILLIAM D. CROPLEY.

References Cited in the file of this patent
UNITED STATES PATENTS

| Number | Name | Date |
|---|---|---|
| 1,416,876 | Replogle | May 23, 1922 |
| 1,859,861 | Ballou | May 24, 1932 |
| 2,135,927 | Voorhees | Nov. 8, 1938 |
| 2,364,069 | Hahn | Dec. 5, 1944 |
| 2,577,863 | Sosnowich | Dec. 11, 1951 |